(12) United States Patent
Kim et al.

(10) Patent No.: US 9,413,506 B2
(45) Date of Patent: Aug. 9, 2016

(54) METHOD AND APPARATUS FOR ALLOCATING RESOURCES IN WIRELESS COMMUNICATION SYSTEM

(71) Applicant: LG ELECTRONICS INC., Seoul (KR)

(72) Inventors: Kitae Kim, Anyang-si (KR); Jinyoung Chun, Anyang-si (KR); Sunam Kim, Anyang-si (KR); Jiwon Kang, Anyang-si (KR); Binchul Ihm, Anyang-si (KR); Sungho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 225 days.

(21) Appl. No.: 14/347,573

(22) PCT Filed: Sep. 19, 2012

(86) PCT No.: PCT/KR2012/007490
§ 371 (c)(1),
(2) Date: Mar. 26, 2014

(87) PCT Pub. No.: WO2013/062238
PCT Pub. Date: May 2, 2013

(65) Prior Publication Data
US 2014/0301329 A1 Oct. 9, 2014

Related U.S. Application Data

(60) Provisional application No. 61/550,451, filed on Oct. 24, 2011.

(51) Int. Cl.
*H04L 5/02* (2006.01)
*H04L 5/00* (2006.01)
*H04L 1/18* (2006.01)

(52) U.S. Cl.
CPC ............ *H04L 5/0053* (2013.01); *H04L 1/1861* (2013.01); *H04L 1/1896* (2013.01);

(Continued)

(58) Field of Classification Search
None
See application file for complete search history.

(56) References Cited

U.S. PATENT DOCUMENTS

| 8,755,339 B2 * | 6/2014 | Li | H04L 5/0053 370/329 |
| 2010/0080187 A1 * | 4/2010 | Papasakellariou | H04L 5/0051 370/329 |
| 2011/0268062 A1 * | 11/2011 | Ji | H04L 5/0055 370/329 |

FOREIGN PATENT DOCUMENTS

| JP | 2013-507875 | 3/2013 |
| JP | 2013-526206 | 6/2013 |
| WO | 2010/050234 | 5/2010 |

OTHER PUBLICATIONS

LG Electronics, "Correction on HARQ-ACK procedure", R1-113181, 3GPP TSG-RAN WG1 Meeting #66bis, Oct. 2011, 14 pages.

(Continued)

*Primary Examiner* — Alex Skripnikov
(74) *Attorney, Agent, or Firm* — Lee, Hong, Degerman, Kang & Walmey; Jonathan Kang; Michael Monaco

(57) ABSTRACT

A multiple distributed system is disclosed. An uplink control resource allocation method for a user equipment to transmit an Acknowledgement/Negative ACK (ACK/NACK) signal includes receiving one or more Enhanced-Physical Downlink Control Channels (E-PDCCHs), receiving one or more Physical Downlink Shared Channels (PDSCHs) corresponding to the one or more E-PDCCHs, and transmitting ACK/NACK signals for reception of the one or more PDSCHs through a Physical Uplink Control Channel (PUCCH), wherein Control Channel Element (CCE) indexes of the PUCCH transmitting the ACK/NACK signals are determined in consideration of first CCE indexes of the one or more E-PDCCHs and the number of CCEs of a PUCCH determined by a higher layer.

8 Claims, 15 Drawing Sheets

(52) U.S. Cl.
CPC ............ *H04L 5/001* (2013.01); *H04L 5/0023* (2013.01); *H04L 5/0055* (2013.01); *H04L 5/0094* (2013.01); *H04L 5/0035* (2013.01)

(56) References Cited

OTHER PUBLICATIONS

LG Electronics, "Design aspects for enhanced PDCCH transmission", R1-113193, 3GPP TSG RAN WG1 Meeting #66bis, Oct. 2011, 4 pages.
LG Electronics, "Discussion on DL/UL control channel for HARQ with ePDCCH", R1-113197, 3GPP TSG RAN WG1 Meeting #66 bis, Oct. 2011, 4 pages.
PCT International Application No. PCT/KR2012/007490, Written Opinion of the International Searching Authority dated Feb. 25, 2013, 9 pages.
Catt, "Design of enhanced PDCCH in Rel-11," 3GPP TSG RAN WG1 Meeting #66, R1-112119, Aug. 2011, 4 pages.
3rd Generation Partnership Project (3GPP), "Technical Specification Group Radio Access Network; Evolved Universal Terrestrial Radio Access (E-UTRA); Physical layer procedures (Release 10)," 3GPP TS 36.213, V10.3.0, Sep. 2011, 122 pages.
LG Electronics, "Discussion on PUCCH Resource for ePDCCH," 3GPP TSG RAN WG1 Meeting #69, R1-122314, May 2012, 2 pages.
European Patent Office Application Serial No. 12842989.1, Search Report dated Jun. 25, 2015, 8 pages.

\* cited by examiner

-- Prior Art --

-- Prior Art --

FIG. 14

| Resource Index | Multiplexed CS Index | PUCCH format Index type | Physical RB index | Predefined for E-PDCCH |
|---|---|---|---|---|
| 0 | 0 | | | |
| 1 | 1 | | m = 0 | |
| ⋮ | ⋮ | | | |
| 11 | 11 | $n_{PUCCH}^{(2)}$ | | |
| 13 | 0 | | | |
| 14 | 1 | | m = 1 | |
| ⋮ | ⋮ | | | |
| 23 | 11 | | | |
| 24,25,26 | 0 | | | |
| 27,28,29 | 1 | $n_{PUCCH}^{(1)}$ | m = 2 | For Rel-8/9/10 UEs |
| ⋮ | ⋮ | | | |
| 45,46,47 | 7 | | | |
| 48 | 8 | Guard Cyclic Shift(not used) | | |
| 49 | 9 | $n_{PUCCH}^{(2)}$ | m = 2 | |
| 50 | 10 | | | |
| 51 | 11 | Guard Cyclic Shift(not used) | | |
| 52,53,54 | 0 | | | |
| 55,56,57 | 1 | | m = 3 | |
| ⋮ | ⋮ | | | |
| 85,86,87 | 11 | $n_{PUCCH}^{(1)}$ | | |
| 88,89,90 | 0 | | | |
| 91,92,93 | 1 | | m = 4 | Only For Rel-11 UEs (E-PDCCH) |
| ⋮ | ⋮ | | | |
| 121,122,123 | 11 | | | |

METHOD AND APPARATUS FOR ALLOCATING RESOURCES IN WIRELESS COMMUNICATION SYSTEM

CROSS-REFERENCE TO RELATED APPLICATIONS

This application is the National Stage filing under 35 U.S.C. 371 of International Application No. PCT/KR2012/007490, filed on Sep. 19, 2012, which claims the benefit of U.S. Provisional Application Ser. No. 61/550,451, filed on Oct. 24, 2011, the contents of which are all hereby incorporated by reference herein in their entirety.

TECHNICAL FIELD

The present invention relates to a wireless communication system and, more particularly, to a method and apparatus for allocating frequency resources of new control channels presenting in data regions of nodes in a distributed multi-node system.

BACKGROUND ART

Recently, attention is being paid to a Multiple-Input Multiple-Output (MIMO) system to maximize the performance and communication capacity of a wireless communication system. MIMO technology refers to a scheme capable of improving data transmission/reception efficiency using multiple transmit antennas and multiple receive antennas, instead of using a single transmit antenna and a single receive antenna. The MIMO system is also called a multi-antenna system. MIMO technology applies a technique of completing a whole message by gathering data fragments received via several antennas without depending on a single antenna path in order to form one whole message. Consequently, MIMO technology can improve data transmission rate in a specific range or increase a system range at specific data transmission rate.

MIMO technology includes transmit diversity, spatial multiplexing, and beamforming. Transmit diversity is a technique for increasing transmission reliability by transmitting the same data through multiple transmit antennas. Spatial multiplexing is a technique capable of transmitting data at high rate without increasing system bandwidth by simultaneously transmitting different data through multiple transmit antennas. Beamforming is used to increase a Signal to Interference plus Noise Ratio (SINR) of a signal by adding a weight to multiple antennas according to a channel state. In this case, the weight can be expressed by a weight vector or a weight matrix, which is respectively referred to as a precoding vector or a precoding matrix.

Spatial multiplexing is divided into spatial multiplexing for a single user and spatial multiplexing for multiple users. Spatial multiplexing for a single user is called Single User MIMO (SU-MIMO) and spatial multiplexing for multiple users is called Spatial Division Multiple Access (SDMA) or Multi User MIMO (MU-MIMO).

The capacity of a MIMO channel increases in proportion to the number of antennas. The MIMO channel may be divided into independent channels. Assuming that the number of transmit antennas is Nt and the number of receive antennas is Nr, the number of independent channels, Ni, is Ni=min{Nt, Nr}. Each of the independent channels may be said to be a spatial layer. A rank is the number of non-zero eigenvalues of a MIMO channel matrix and may be defined as the number of spatial streams that can be multiplexed.

In the MIMO system, each transmit antenna has an independent data channel. The transmit antenna may mean a virtual antenna or a physical antenna. A receiver estimates a channel for each transmit antenna to receive data transmitted from each transmit antenna. Channel estimation refers to a process of restoring a received signal by compensating for distortion of the signal caused by fading. Fading refers to a phenomenon in which signal strength abruptly varies due to multi-path time delay in a wireless communication system environment. For channel estimation, a reference signal that is known to both a transmitter and a receiver is needed. The reference signal may be referred simply to as an RS or may be referred to as a pilot according to applied standard.

A downlink reference signal is a pilot signal for coherent demodulation of a Physical Downlink Shared Channel (PDSCH), a Physical Control Format Indicator Channel (PCFICH), a Physical Hybrid Indicator Channel (PHICH), a Physical Downlink Control Channel (PDCCH), etc. The downlink reference signal includes a Common Reference Signal (CRS) shared by all User Equipments (UEs) in a cell and a Dedicated Reference Signal (DRS) for a specific UE. The CRS may be called a cell-specific reference signal and the DRS may be called UE-specific reference signal.

As compared to a legacy communication system supporting a transmit antenna, (e.g. a system according to LTE releases 8 or 9), a system having an extended antenna configuration, (e.g. a system supporting 8 transmit antennas according to LTE-A), needs to transmit a reference signal for obtaining Channel State Information (CSI), i.e. a CSI-RS, in a receiver.

DISCLOSURE

Technical Problem

An object of the present invention is to provide a method and apparatus for efficiently allocating resources for a physical channel in a wireless communication system. Another object of the present invention is to provide a channel format and signal processing for efficiently transmitting control information, and an apparatus therefor. A further object of the present invention is to provide a method and apparatus for efficiently allocating resources for transmitting control information.

It will be appreciated by persons skilled in the art that that the technical objects that can be achieved through the present invention are not limited to what has been particularly described hereinabove and other technical objects of the present invention will be more clearly understood from the following detailed description.

Technical Solution

The object of the present invention can be achieved by providing an uplink control resource allocation method for a user equipment to transmit an Acknowledgement/Negative ACK (ACK/NACK) signal in a wireless communication system, including receiving one or more Enhanced-Physical Downlink Control Channels (E-PDCCHs), receiving one or more Physical Downlink Shared Channels (PDSCHs) corresponding to the one or more E-PDCCHs, and transmitting ACK/NACK signals for reception of the one or more PDSCHs through a Physical Uplink Control Channel (PUCCH), wherein Control Channel Element (CCE) indexes of the PUCCH transmitting the ACK/NACK signals are determined in consideration of first CCE indexes of the one or more E-PDCCHs and the number of CCEs of a PUCCH determined by a higher layer.

In another aspect of the present invention, provided herein is a method for a base station to receive an Acknowledgement/Negative ACK (ACK/NACK) signal according to uplink control resource allocation in a wireless communication system, including transmitting one or more Enhanced-Physical Downlink Control Channels (E-PDCCHs), transmitting one or more Physical Downlink Shared Channels (PDSCHs) corresponding to the one or more E-PDCCHs, and receiving ACK/NACK signals for transmission of the one or more PDSCHs through a Physical Uplink Control Channel (PUCCH), wherein Control Channel Element (CCE) indexes of the PUCCH receiving the ACK/NACK signals are determined in consideration of first CCE indexes of the one or more E-PDCCHs and the number of CCEs of a PUCCH determined by a higher layer.

In a further aspect of the present invention, provided herein is a user equipment for allocating resources for uplink control to transmit an Acknowledgement/Negative ACK (ACK/NACK) signal in a wireless communication system, including a Radio Frequency (RF) unit, and a processor, wherein the processor controls the RF unit to receive one or more Enhanced-Physical Downlink Control Channels (E-PDCCHs), receive one or more Physical Downlink Shared Channels (PDSCHs) corresponding to the one or more E-PDCCHs, and transmit ACK/NACK signals for reception of the one or more PDSCHs through a Physical Uplink Control Channel (PUCCH), and wherein Control Channel Element (CCE) indexes of the PUCCH transmitting the ACK/NACK signals are determined in consideration of first CCE indexes of the one or more E-PDCCHs and the number of CCEs of a PUCCH determined by a higher layer.

In still another aspect of the present invention, provided herein is a base station for receiving an Acknowledgement/Negative ACK (ACK/NACK) signal according to uplink control resource allocation in a wireless communication system, including a Radio Frequency (RF) unit, and a processor, wherein the processor controls the RF unit to transmit one or more Enhanced-Physical Downlink Control Channels (E-PDCCHs), transmit one or more Physical Downlink Shared Channels (PDSCHs) corresponding to the one or more E-PDCCHs, and receive ACK/NACK signals for transmission of the one or more PDSCHs through a Physical Uplink Control Channel (PUCCH), and wherein Control Channel Element (CCE) indexes of the PUCCH receiving the ACK/NACK signals are determined in consideration of first CCE indexes of the one or more E-PDCCHs and the number of CCEs of a PUCCH determined by a higher layer.

The CCE indexes of the PUCCH transmitting the ACK/NACK signals may be determined by the sum of the first CCE indexes of the one or more E-PDCCHs and the number of CCEs of the PUCCH determined by the higher layer.

First CCE indexes of the one or more E-PDCCHs in an interleaving region may be determined by further considering a total number of CCEs of a PDCCH.

The first CCE indexes of the one or more E-PDCCHs in a non-interleaving region may be minimum resource block indexes of the one or more E-PDCCHs and may be determined by further considering a total number of CCEs of the PDCCH.

If the user equipment monitors a region of the PDCCH, the user equipment may calculate a total number of CCEs of the PDCCH and, if the user equipment does not monitor the region of the PDCCH, the user equipment may receive the total number of CCEs of the PDCCH from a base station.

If an interleaving region and a non-interleaving region share a resource region of the PUCCH, a resource index of the PUCCH may be determined by further considering the total number of CCEs of the PUCCH in the interleaving region.

The first CCE indexes of the E-PDCCHs may be determined based on the CCE indexes of the PUCCH transmitting the ACK/NACK signals by configuring a Demodulation Reference Signal (DMRS) antenna port.

The CCE indexes of the PUCCH transmitting the ACK/NACK signals may be semi-statically configured through additional signaling and may be configured by dividing regions according to each E-PDCCH set.

Advantageous Effects

According to embodiments of the present invention, resources for a physical channel can be efficiently allocated in a wireless communication system, desirably, in a distributed multi-node system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings:

FIG. 14 illustrates separate configuration of a PUCCH ACK/NACK resource for an E-PDCCH according to the present invention.

BEST MODE

Figure 1:
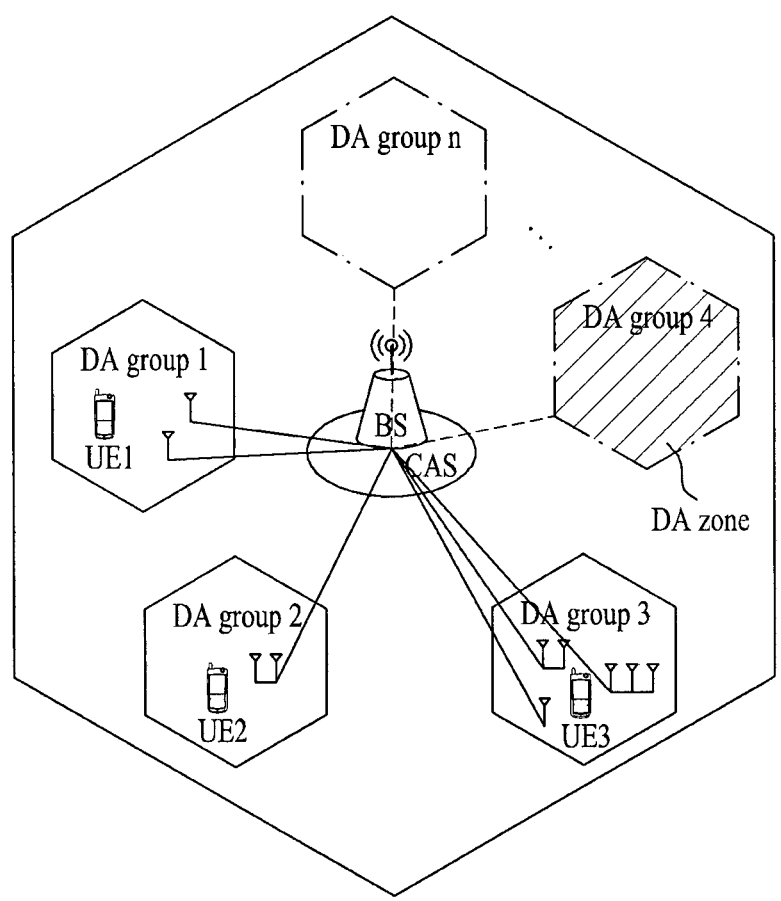
FIG. 1 illustrates the structure of a DAS to which the present invention is applied.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following detailed description is given under the assumption of a 3GPP LTE system or an IEEE 802.16m system it is applicable to other mobile communication systems except for matters that are specific to the 3GPP LTE system or IEEE 802.16m system.

In some instances, known structures and devices are omitted or are shown in block diagram form, focusing on important features of the structures and devices, so as not to obscure the concept of the present invention. The same reference numbers will be used throughout this specification to refer to the same parts.

A wireless communication system to which the present invention is applicable includes at least one Base Station (BS). Each BS provides a communication service to a User Equipment (UE) located in a specific geographic area (generally, referred to as a cell). The UE may be fixed or mobile and includes various devices that transmit and receive user data and/or control information through communication with the BS. The UE may be referred to as a terminal equipment, a Mobile Station (MS), a Mobile Terminal (MT), a User Terminal (UT), a Subscriber Station (SS), a wireless device, a Personal Digital Assistant (PDA), a wireless modem, a handheld device, etc. The BS refers to a fixed station communicating generally with UEs and/or other BSs and exchanges data and control information with the UEs and other BSs. The BS may be referred to as an evolved-NodeB (eNB), a Base Transceiver System (BTS), an Access Point, a Processing Server (PS), etc.

A cell area in which a BS provides a service may be divided into a plurality of subareas in order to improve system performance. Each of the plurality of subareas may be referred to as a sector or a segment. A cell identity (Cell ID or IDCell) is assigned based on a total system, whereas a sector or segment identity is assigned based on a cell area in which the BS provides a service. Generally, a UE is distributed in a wireless communication system and may be fixed or mobile. Each UE may communicate with one or more BSs through Uplink (UL) or Downlink (DL) at a given time.

The present invention may be applied to various types of multi-node systems. For example, the embodiments of the present invention may be applied to a Distributed Antenna System (DAS), a macro node having low power Radio Remote Heads (RRHs), a multi-BS cooperative system, a pico-/femto-cell cooperative system, and a combination thereof. In a multi-node system, one or more BSs connected to a plurality of nodes may cooperate with each other to simultaneously transmit signals to a UE or to simultaneously receive signals from the UE.

A DAS uses, for communication, a plurality of distributed antennas connected to one BS or one BS controller for managing a plurality of antennas located at a prescribed interval in an arbitrary geographic area (called a cell) through a cable or a dedicated line. In the DAS, each antenna or each antenna group may be one node of a multi-node system of the present invention. Each antenna of the DAS may operate as a subset of antennas included in one BS or one BS controller. Namely, the DAS is a kind of the multi-node system and a distributed antenna or antenna group is a kind of a node in a multi-antenna system. The DAS is distinguished from a Centralized Antenna System (CAS) having a plurality of antennas centralized at the center of a cell, in that a plurality of antennas included in the DAS is distributed at a prescribed interval in a cell. The DAS is different from a femto-/pico-cell cooperative system in that one BS or one BS controller manages all distributed antennas or distributed antenna groups located in a cell at the center of the cell, rather than each antenna unit manages an antenna area. The DAS is also different from a relay system or an ad-hoc network that uses a BS connected wirelessly to a relay station in that distributed antennas are connected to each other through a cable or a dedicated line. Moreover, the DAS is distinguished from a repeater that simply amplifies a signal and transmits the amplified signal in that a distributed antenna or a distributed antenna group can transmit a signal different from a signal transmitted by other distributed antennas or other distributed antenna groups to a UE located around the corresponding antenna or antenna group according to a command of a BS or a BS controller.

Nodes of a multi-BS cooperative system or femto-/pico-cell cooperative system operate as independent BSs and cooperate with one another. Accordingly, each BS of the multi-BS cooperative system or femto-/pico-cell cooperative system may be a node in a multi-node system of the present invention. Multiple nodes of the multi-BS cooperative system or femto-/pico-cell cooperative system are connected to one another through a backbone network and perform cooperative transmission/reception by performing scheduling and/or handover together. In this way, a system in which a plurality of BSs participates in cooperative transmission is referred to as a Coordinated Multi-Point (CoMP) system.

There are differences between various types of multi-node systems such as a DAS, a macro node having low power PRHs, a multi-BS cooperative system, and a femto-/pico-cell cooperative system. However, since the multi-node system is different from a single-node system (e.g. a CAS, a conventional MIMO system, a conventional relay system, and a conventional repeater system) and a plurality of nodes of the multi-node system participates in providing a communication service to UEs through cooperation, the embodiments of the present invention can be applied to all types of multi-node systems. For convenience of description, the present invention will describe a DAS by way of example. However, the following description is purely exemplary. Since an antenna or an antenna group of a DAS may correspond to a node of another multi-node system and a BS of the DAS corresponds to one or more cooperative BSs of another multi-node system, the present invention is applicable to other multi-node systems in a similar way.

FIG. 1 illustrates the structure of a DAS to which the present invention is applied. Specifically, FIG. 1 illustrates the structure of a system in the case where the DAS is applied to a CAS using conventional cell-based multiple antennas.

Referring to FIG. 1, a plurality of Centralized Antennas (CAs) having similar path loss effects due to a very short antenna interval relative to a cell radius may be located in an area adjacent to a BS. In addition, a plurality of Distributed Antennas (DAs) separated from each other by a predetermined distance or more and having different path loss effects due to a wider antenna interval than the CAs may be located in a cell area.

One or more DAs connected by wire to the BS are configured. The DA has the same meaning as an antenna node for use in a DAS or as an antenna node. One or more DAs constitute one DA group to form a DA zone.

The DA group includes one or more DAs. The DA group may be variably configured according to the location or signal reception state of a UE or may be fixedly configured to a maximum antenna number used in MIMO. The DA group may be called an antenna group. The DA zone is defined as a range within which antennas forming a DA group can transmit or receive signals. The cell area shown in FIG. 1 includes n DA zones. A UE belonging to a DA zone may perform communication with one or more DAs constituting the DA zone. A BS simultaneously uses DAs and CAs while transmitting signals to a UE belonging to a DA zone, thereby raising transmission rate.

FIG. 1 illustrates a DAS applied to a CAS structure using conventional multiple antennas so that a ES and a UE can use the DAS. Although the locations of CAs and DAs are distinguished for brevity of description, the present invention is not limited thereto and the CAs and DAs are variously located according to implementation form.

As illustrated in FIG. 1, antennas or antenna nodes supporting each UE may be limited. Especially, during DL data transmission, different data for each antenna or antenna node may be transmitted to different UEs through the same time and frequency resources. This may be interpreted as a sort of MU-MIMO operation of transmitting different data streams per antenna or antenna node through selection of an antenna or antenna node.

In the present invention, each antenna or antenna node may be an antenna port. The antenna port is a logical antenna implemented by one physical transport antenna or a combination of a plurality of physical transport antennas. In the present invention, each antenna or antenna node may also be a virtual antenna. In a beamforming scheme, a signal transmitted by one precoded beam may be recognized as a signal transmitted by one antenna and the one antenna transmitting the precoded beam is called a virtual antenna. In the present invention, antennas or antenna nodes may be distinguished by a reference signal (pilot). An antenna group including one or more antennas that transmit the same reference signal or the same pilot refers to a set of one or more antennas that transmit the same reference signal or pilot. That is, each antenna or antenna node of the present invention may be interpreted as a physical antenna, a set of physical antennas, an antenna port, a virtual antenna, or an antenna distinguished by a reference signal/pilot. In the embodiments of the present invention to be described later, an antenna or antenna node may represent any one of a physical antenna, a set of physical antennas, an antenna port, a virtual antenna, and an antenna distinguished by a reference signal/pilot. Hereinafter, the present invention will be explained by referring to a physical antenna, a set of physical antennas, an antenna port, a virtual antenna, or an antenna distinguished by a reference signal/pilot as an antenna or antenna node.

Figure 2:
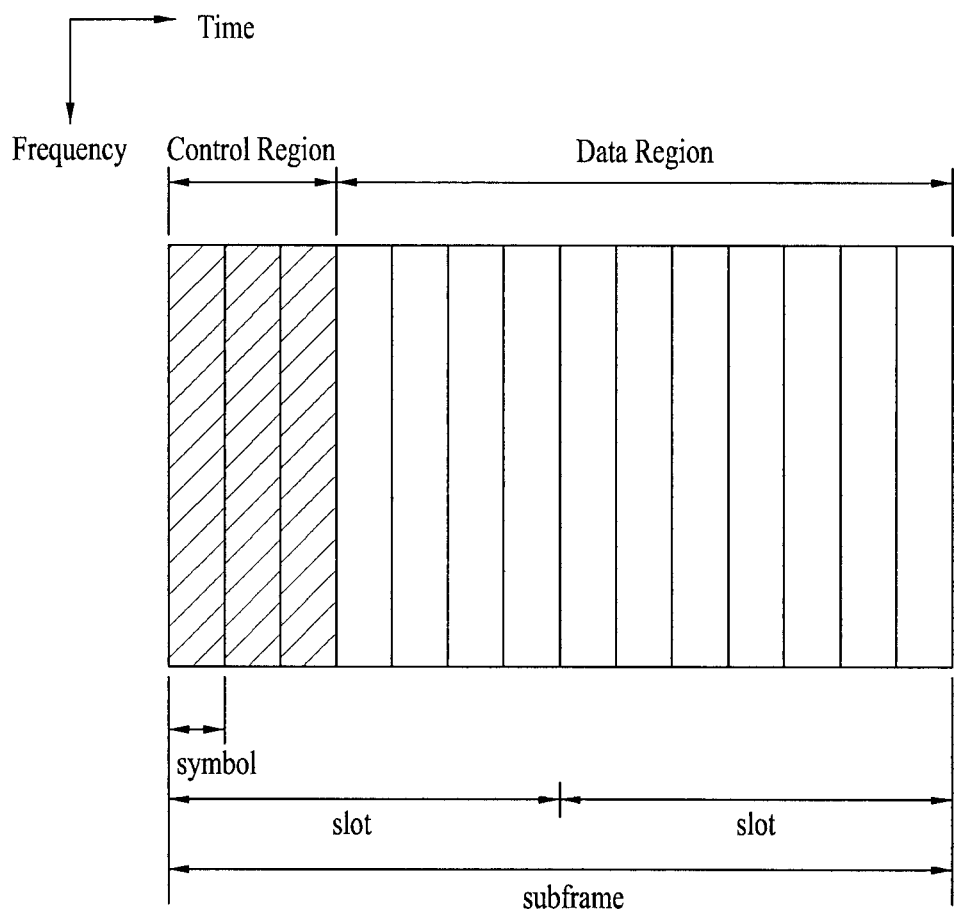
FIG. 2 illustrates a control region in which a PDCCH can be transmitted in a 3GPP LTE/LTE-A system.

Referring to FIG. 2, a radio frame used in 3GPP LTE/LTE-A systems is 10 ms (327,200$T_s$) in duration and includes 10 equally-sized subframes, each subframe being 1 ms long. Each subframe includes two slots, each 0.5 ms in duration. Here, $T_s$ represents a sampling time and is given as $T_s=1/(2,048\times15$ kHz). A slot includes a plurality of Orthogonal Frequency Division Multiplexing Access (OFDMA) symbols in the time domain and a plurality of Resource Blocks (RBs) in the frequency domain. An RB includes a plurality of subcarriers in the frequency domain. An OFDMA symbol may be called an OFDM symbol or an SC-FDMA symbol according to a multiple access scheme. The number of OFDMA symbols included in one slot may vary according to channel bandwidth or the length of a Cyclic Prefix (CP). For example, in a normal CP, one slot includes 7 OFDMA symbols, whereas in an extended CP, one slot includes 6 OFDMA symbols. In FIG. 2, although a subframe in which one slot includes 7 OFDMA symbols is illustrated for convenience of description, the embodiments of the present invention to be described later are applicable to other types of subframes in a similar way. For reference, a resource composed of one OFDMA symbol and one subcarrier is called a Resource Element (RE) in the 3GPP LTE/LTE-A systems.

In the 3GPP LTE/LTE-A systems, each subframe includes a control region and a data region. The control region includes one or more OFDMA symbols starting from the first OFDMA symbol. The size of the control region may be independently configured for each subframe. A PCFICH, a Physical Hybrid automatic repeat request (ARQ) Indicator Channel (PHICH) as well as a PDCCH may be allocated to the control region.

As shown in FIG. 2, control information is transmitted to a UE using predetermined time and frequency resources among radio resources. Control information for UEs is transmitted together with MAP information in a control channel. Each UE searches for and then receives a control channel thereof among control channels transmitted by a BS. Resources occupied by control channels inevitably increase as the number of UEs within a cell increases. If Machine to Machine (M2M) communication and a DAS are actively used, the number of UEs in a cell will further increase. Then, control channels for supporting the UEs also increase. Namely, the number of OFDMA symbols and/or the number of subcarriers occupied by control channels in one subframe increase inevitably. Accordingly, the present invention provides methods for efficiently using a control channel using the characteristic of a DAS.

In accordance with current CAS-based communication standards, all antennas belonging to one BS transmit control channels (e.g. MAP, A-MAP, PDCCH etc.) for all UEs in the BS in a control region. To obtain control information such as information about an antenna node allocated to a UE and DL/UL resource allocation information, each UE should acquire control information thereof by processing the control region which is a common region scheduled for control information transmission. For instance, the UE should obtain control information thereof among signals transmitted through the control region by applying a scheme such as blind decoding.

According to current communication standards, if all antennas transmit control information for all UEs in the same control region, since all antennas transmit the same signal in the control region, implementation is easy. However, if the size of control information to be transmitted increases due to factors such as increase in the number of UEs that the BS should cover, MU-MIMO operation, and additional control information (e.g. information on an antenna node allocated to the UE) for a DAS, the size or number of control channels increases and thus it may be difficult to transmit all control information using an existing control region.

Figure 3:
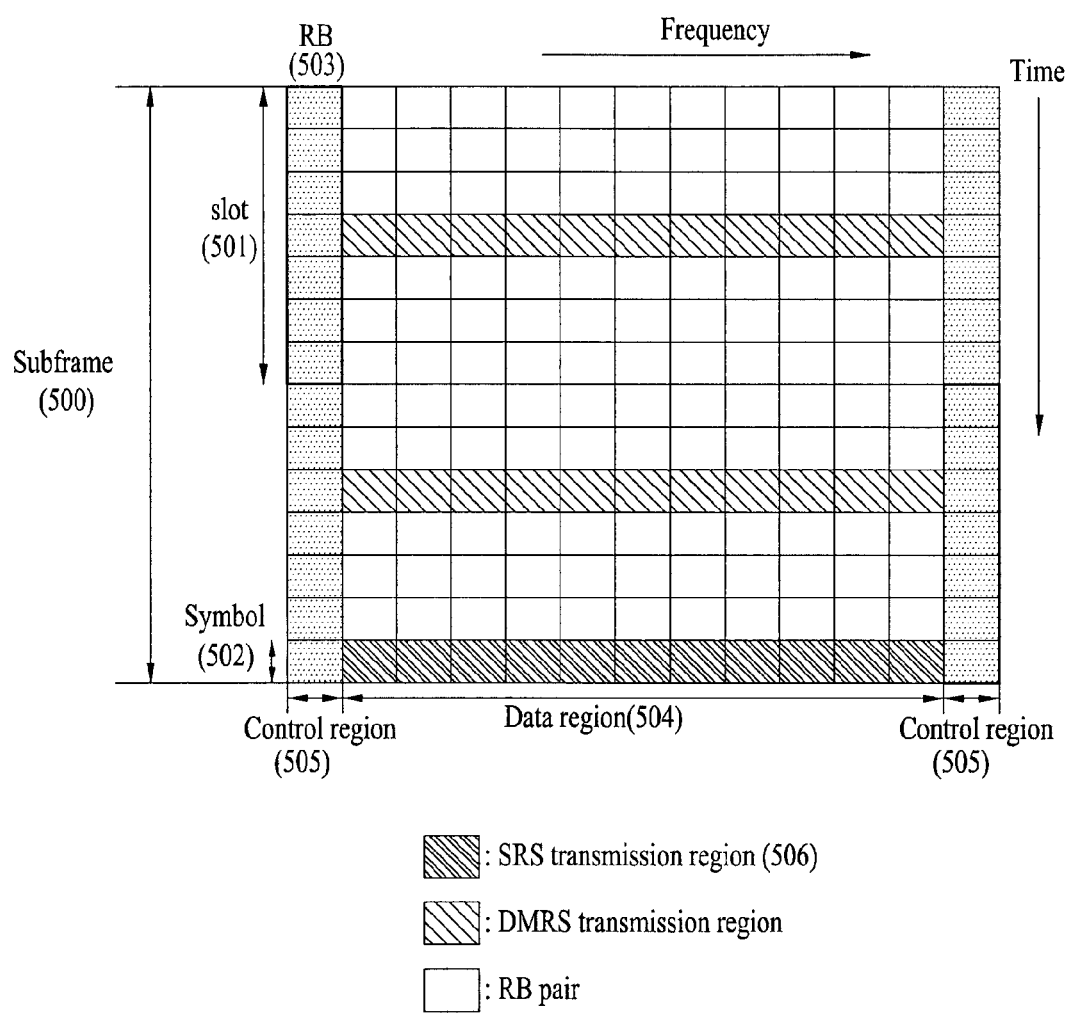
FIG. 3 illustrates the structure of a UL subframe used in a 3GPP system.

FIG. 3 illustrates a UL subframe structure in a 3GPP system.

Referring to FIG. 3, a 1-ms subframe 500, a basic unit for LTE UL transmission, includes two 0.5-ms slots 501. On the assumption of a normal CP, each slot has 7 symbols 502, each symbol corresponding to an SC-FDMA symbol. An RB 503 is a resource allocation unit defined as 12 subcarriers in the frequency domain and one slot in the time domain. The LTE UL subframe is largely divided into a data region 504 and a control region 505. The data region 504 refers to communication resources used to transmit data such as voice data and packets and includes a Physical Uplink Shared Channel (PUSCH). The control region 505 refers to communication resources used for each UE to transmit a DL channel quality report, an ACK/NACK for a received DL signal, and a UL scheduling request and includes a Physical Uplink Control Channel (PUCCH). A Sounding Reference Signal (SRS) is transmitted in the last SC-FDMA symbol of a subframe in the time domain and in a data transmission band in the frequency domain. SRSs transmitted in the last SC-FDMA symbol of the same subframe from a plurality of UEs can be distinguished by their frequency positions/sequences.

Hereinbelow, a description will be given of RB mapping. A Physical Resource Block (PRB) and a Virtual Resource Block (VRB) are defined. The PRB is configured as illustrated in FIG. 3. In other words, the PRB is defined as $N_{symb}^{DL}$ contiguous OFDM symbols in the time domain and $N_{sc}^{RB}$ contiguous subcarriers in the frequency domain. PRBs are numbered from 0 to $N_{RB}^{DL}-1$ in the frequency domain. The relationship between a PRB number $n_{PRB}$ and an RE (k, l) in a slot is given by Equation 1.

$$n_{PRB} = \left\lfloor \frac{k}{N_{sc}^{RB}} \right\rfloor \quad \text{[Equation 1]}$$

where k denotes a subcarrier index and $N_{sc}^{RB}$ denotes the number of subcarriers in an RB.

The VRB is equal in size to the PRB. A Localized VRB (LVRB) of a localized type and a Distributed VRB (DVRB) of a distributed type are defined. Irrespective of VRB type, a pair of VRBs with the same. VRB number $n_{VRB}$ is allocated over two slots of a subframe.

SRSs are transmitted in the last SC-FDMA symbol of one subframe in the time domain and in a data transmission band in the frequency domain. SRSs transmitted in the last SC-FDMA symbol of the same subframe from a plurality of UEs can be distinguished by frequency position.

A Demodulation Reference Signal (DMRS) is transmitted in the middle SC-FDMA symbol of each slot in one subframe in the time domain and in a data transmission band in the frequency domain. For example, in a subframe to which a normal CP is applied, DMRSs are transmitted in the 4th and 11th SC-FDMA symbols.

The DMRS may be associated with the transmission of a PUSCH or PUCCH. The SRS is a reference signal transmitted from a UE to a BS for UL scheduling. The BS estimates a UL channel through the received SRS and uses the estimated UL channel for UL scheduling. The SRS is not associated with the transmission of a PUSCH or PUCCH. The same kind of basic sequence may be used for the DMRS and the SRS. Meanwhile, in UL multi-antenna transmission, precoding applied to the DMRS may be the same as precoding applied to the PUSCH.

The BS informs the UE of demodulation pilot information such as DMRS information of the BS so that the UE can directly measure a channel. The DMRS information includes a sequence, an RE type, an allocated resource type, a port position, the number of beams, or the number of ranks. Accordingly, the UE can obtain a PDSCH signal corresponding to a PDCCH through the PDCCH by use of the DMRS information.

A reference signal, especially, a DMRS sequence for a PUSCH may be defined by Equation 2.

$$r_{n_s}(m) = \frac{1}{\sqrt{2}}(1 - 2 \cdot c(2m)) + j\frac{1}{\sqrt{2}}(1 - 2 \cdot c(2m+1)), \quad \text{[Equation 2]}$$

$$m = 0, 1, \ldots, 12N_{RB}^{PDSCH} - 1$$

Referring to Equation 2, a UE-specific reference signal $r_{n_s}$(m) for port 5 has a value between −1 and 1 by the difference between c(2m) or c(2m+1) and 1. A QPSK normalization value according to an average power value can be obtained by $$\frac{1}{\sqrt{2}}.$$

In Equation 2, c(i) denotes a pseudo-random sequence which is a PN sequence and may be defined by a length-31 Gold sequence. Equation 3 indicates an example of a Gold sequence c(n).

$$C_{init} = (\lfloor n_s/2 \rfloor + 1) \cdot (2N_{ID}^{cell} + 1) \cdot 2^{16} \quad \text{[Equation 3]}$$

where $n_{RNTI}$ denotes a UE-specific unique ID.

Reference signals for other ports 7, 8, 9, and 10 may be defined by Equation 4.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 4]}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

In Equation 4, c(i) denotes a pseudo-random sequence, which is a PN sequence, and may be defined by a length-31 Gold sequence. Equation 5 indicates an example of the gold sequence c(n).

$$C_{init} = (\lfloor n_s/2 \rfloor + 1) \cdot (2N_{ID}^{cell} + 1) \cdot 2^{16} + n_{SCID} \quad \text{[Equation 5]}$$

where $C_{init}$ denotes an initial sequence, $n_s$ denotes a slot number in one radio frame, $N_{ID}^{cell}$ denotes a virtual cell ID, $n_{SCID}$ denotes a UE-specific unique ID for antenna ports 7 and 8 and may be defined by the following Table 1. Accordingly, $n_{SCID}$ has a value of 0 or 1 and is transmitted as 1-bit signaling.

TABLE 1

| Scrambling identity field in DCI format 2B or 2C [3] | $n_{SCID}$ |
|---|---|
| 0 | 0 |
| 1 | 1 |

As described above, $n_{RNTI}$ or $n_{SCID}$ is a value determined initially in a connection process between the UE and the BS.

A PDCCH indicates a control channel allocated to a DL subframe. In a system of 3GPP Rel-11 or more, introduction of a multi-node system including a plurality of access nodes in a cell has been determined for performance improvement (here, the multi-node system includes a DAS, an RRH, etc. and will be collectively referred to as an RRH hereinbelow). Standardization tasks for applying various MIMO schemes and cooperative communication schemes, that are being developed or are applicable in the future, to a multi-node environment is under way. Basically, although improvement of link quality is expected because various communication schemes such as a localized or cooperative scheme for each UE/BS can be applied due to the introduction of an RRH, the immediate introduction of a new control channel is needed in order to apply the above-mentioned various MIMO schemes and cooperative communication schemes to the multi-node environment. Due to such necessity, a control channel mentioned newly as a channel to be introduced is an Enhanced-PDCCH (E-PDCCH) (an RRH-PDCCH and an x-PDCCH are collectively referred to as an e-PDCCH) and a data transmission region (hereinafter, referred to as a PDSCH region)

rather than a legacy control region (hereinafter, referred to as a PDCCH region) is preferred as an allocation position of the E-PDCCH. Consequently, it is possible for each UE to transmit control information for a node through the e-PDCCH and thus a problem caused by shortage of the legacy PDCCH region can be solved.

The legacy PDCCH is transmitted only using transmit diversity in a prescribed region and various schemes used for the PDSCH, such as beamforming, MU-MIMO, best band selection, etc., have not been applied to the legacy PDCCH. For this reason, the PDCCH functions as a bottleneck of system performance and improvement of this problem has been required. In the middle of discussing the new introduction of an RRH for system performance improvement, the necessity of a new PDCCH has been emerged as a method for overcoming insufficient capacity of the PDCCH when cell IDs of RRHs are the same. To distinguish a PDCCH to be newly introduced from the legacy PDCCH, the PDCCH to be newly introduced is referred to as an E-PDCCH. In the present invention, it is assumed that the E-PDCCH is located in the PDSCH region.

Figure 4:
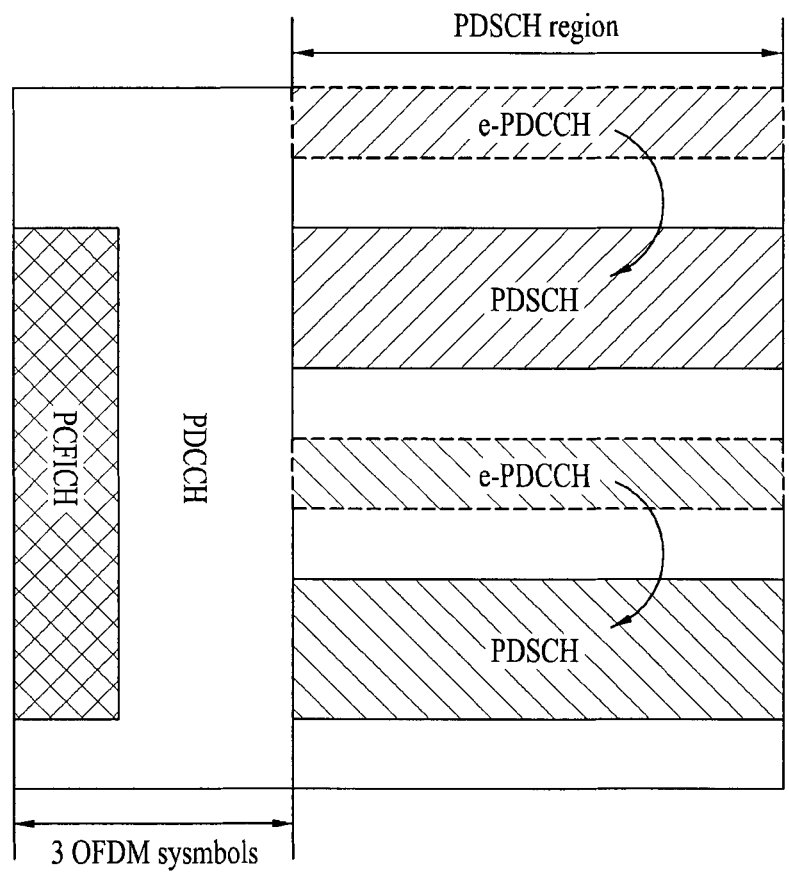
FIG. 4 illustrates an E-PDCCH and a PDSCH scheduled by the E-PDCCH.

FIG. 4 is a diagram illustrating an E-PDCCH and a PDSCH scheduled by the E-PDCCH.

Referring to FIG. 4, the E-PDCCH may use part of a PDSCH region that generally transmits data. A UE should perform blind decoding to detect whether an E-PDCCH thereof is present. Although the E-PDCCH performs a scheduling operation (i.e. PDSCH and PUSCH control) like the legacy PDCCH, if the number of UEs connected to a node such as an RRH increases, a greater number of E-PDCCHs is allocated in the PDSCH region and thus the number of blind decoding attempts to be performed by the UE increases, thereby raising complexity.

Figure 5:
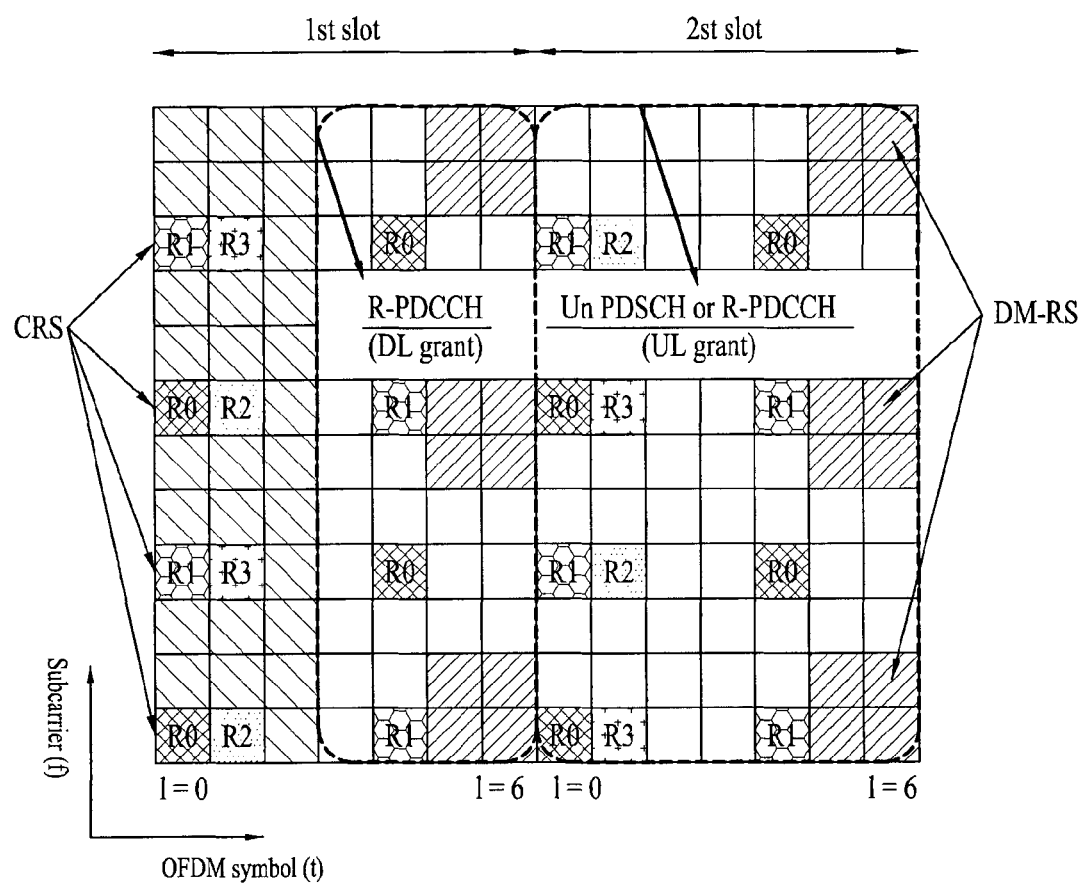
FIG. 5 illustrates the structure of an R-PDCCH transmitted to a relay node.

Meanwhile, an approach to reusing the structure of a legacy R-PDCCH is attempted as a detailed allocation scheme of the E-PDCCH. FIG. 5 is a diagram illustrating the structure of an R-PDCCH transmitted to a relay node.

Referring to FIG. 5, only a DL grant is necessarily allocated to the first slot and a UL grant or a data PDSCH may be allocated to the second slot. In this case, an R-PDCCH is allocated to data REs except for a PDCCH region, CRSs, and DMRSs. Both the DMRS and CRS may be used for R-PDCCH demodulation, and when the DMRS is used, port 7 and a Scrambling ID (SCID) of 0 are used.

Meanwhile, when the CRS is used, port 0 is used only when the number of PBCH transmit antennas is 1, and ports 0 and 1 and ports 0 to 3 are used in transmit diversity mode when the number of PBCH transmission antennas is 2 and 4, respectively.

In a detailed allocation scheme of the E-PDCCH, reusing the structure of the legacy R-PDCCH means separate allocation of a DL grant and a UL grant per slot. That is, the E-PDCCH has a structure following the R-PDCCH. This has an advantage that impact upon existing standard may be relatively insignificant by reusing a known structure.

In the present invention, such an allocation scheme is referred to as prior art 1).

Figure 6:
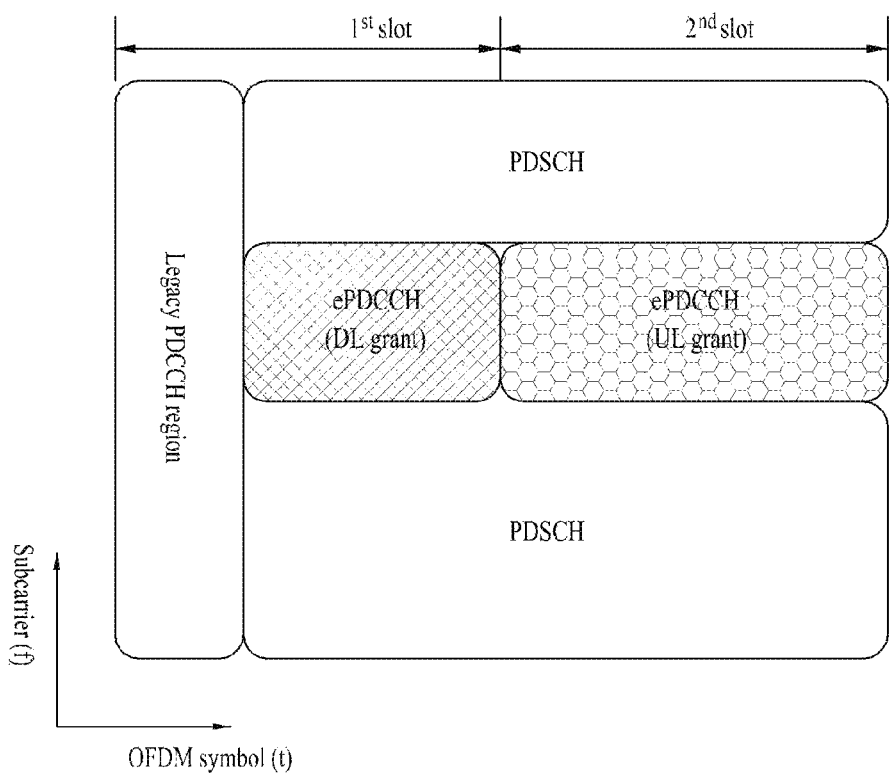
FIG. 6 illustrates allocation of an E-PDCCH according to prior art 1)

FIG. 6 is a diagram illustrating exemplary allocation of an E-PDCCH according to prior art 1).

According to prior art 1), the E-PDCCH is allocated in such a manner that a DL grant is allocated to the first slot of a subframe and a UL grant is allocated to the second slot of the subframe. Herein, it is assumed that the E-PDCCH is configured in both the first slot and the second slot of the subframe. The DL grant and UL grant are separately allocated to the E-PDCCH of the first slot and the E-PDCCH of the second slot, respectively.

Since the DL grant and the UL grant that a UE should detect per slot in a subframe are separated from each other, the UE configures a search region in the first slot to perform blind decoding for detecting the DL grant and configures a search region in the second slot to perform blind decoding for detecting the UL grant.

Meanwhile, a current 3GPP LTE system has a Downlink Transmission Mode (DL TM) and an Uplink Transmission Mode (UL TM). One TM per UE is configured through upper layer signaling. In the DL TM, the number of formats of DL control information that each UE should search for per configured mode, i.e. DCI formats, is 2. In the UL TM, on the other hand, the number of DCI formats that each UE should search for per configured mode is 1 or 2. For example, in UL TM 1, DL control information corresponding to a UL grant includes DCI format 0 and, in UL TM 2, DL control information corresponding to the UL grant includes DCI format 0 and DCI format 4. The DL TM is defined as one of mode 1 to mode 9 and the UL TM is defined as one of mode 1 and mode 2.

Accordingly, the number of blind decoding attempts that should be performed in DL grant and UL grant allocation regions in order for a UE to search for an E-PDCCH thereof in a UE-specific search region per slot as shown in FIG. 6 is as follows.

(1) DL grant=(number of candidate PDCCHs)×(number of DCI formats in configured DL TM)=16×2=32

(2) UL grant in UL TM 1=(number of candidate PDCCHs)×(number of DCI formats in UL TM 1)=16×1=16

(3) UL grant in UL TM 2=(number of candidate PDCCHs)×(number of DCI formats in UL TM 2)=16×2=32

(4) Total number of blind decoding attempts=number of blind decoding attempts in first slot+number of blind decoding attempts in second slot

UL TM 1: 32+16=48

UL TM 2: 32+32=64

Meanwhile, a method for simultaneously allocating both the DL grant and the UL grant to the first slot has been proposed. For convenience of description, this method is referred to as prior art 2).

Figure 7:
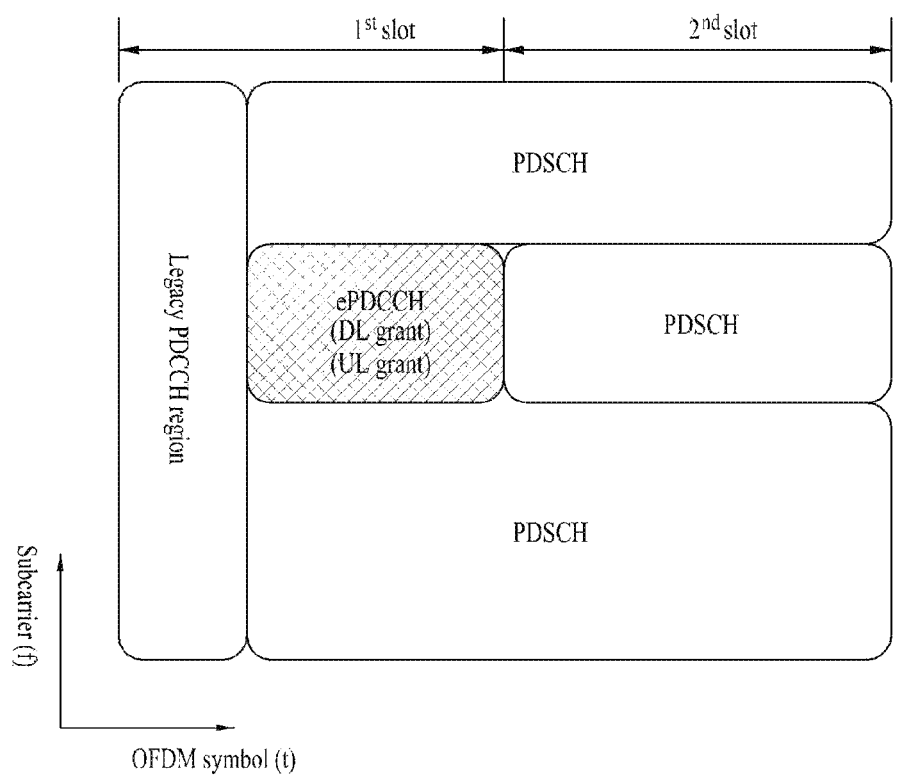
FIG. 7 illustrates allocation of an E-PDCCH according to prior art 2)

FIG. 7 is a diagram illustrating exemplary allocation of an E-PDCCH according to prior art 2).

Referring to FIG. 7, the E-PDCCH is allocated in such a manner that the DL grant and the UL grant are simultaneously allocated to the first slot of a subframe. Especially, it is assumed in FIG. 7 that the E-PDCCH is configured only in the first slot of a subframe. Therefore, both the DL grant and the UL grant are present in the E-PDCCH of the first slot and the UE performs blind decoding for searching for the DL grant and the UL grant only in the first slot of the subframe.

As mentioned previously, in the 3GPP LTE system, a DCI format to be detected is determined according to a TM configured per UE. Especially, a total of two DCI formats per DL TM, i.e. DL grants, is determined and all DL TMs basically include DCI format 1A to support a fallback mode. DCI format 0 among UL grants is equal to DCI format 1A in size and additional decoding is not performed because it can be distinguished through a 1-bit flag. However, for DCI format 4, which is the other format among the UL grants, additional blind decoding should be performed.

Accordingly, the UE performs blind decoding in the same region as the legacy PDCCH region and the number of blind decoding attempts that should be performed to search for the E-PDCCH in a UE-specific search region, i.e. the DL grant and the UL grant, is as follows.

(1) DL grant=(number of candidate PDCCHs)×(number of DCI formats in configured DL TM)=16×2=32

(2) UL grant in UL TM 1=(number of candidate PDCCHs)×(number of DCI formats in UL TM 1)=0

(3) UL grant in UL TM 2=(number of candidate PDCCHs)×(number of DCI formats in UL TM 2)=16×1=16

(4) Total number of blind decoding attempts

UL TM 1: 32+0=32

UL TM 2: 32+16=48

The present invention proposes a DL grant and UL grant allocation method of an E-PDCCH. As previously described, although a main design method of the E-PDCCH can follow the structure of the legacy R-PDCCH, there may be various methods for allocating a DL grant and a UL grant per slot in designing the E-PDCCH unlike the R-PDCCH.

Accordingly, the E-PDCCH, a DL control channel, has a pure FDM structure allocated only for the first slot. However, E-PDCCH allocation, which is being discussed, may be performed in a full FDM structure without being limited to one slot.

Figure 8:
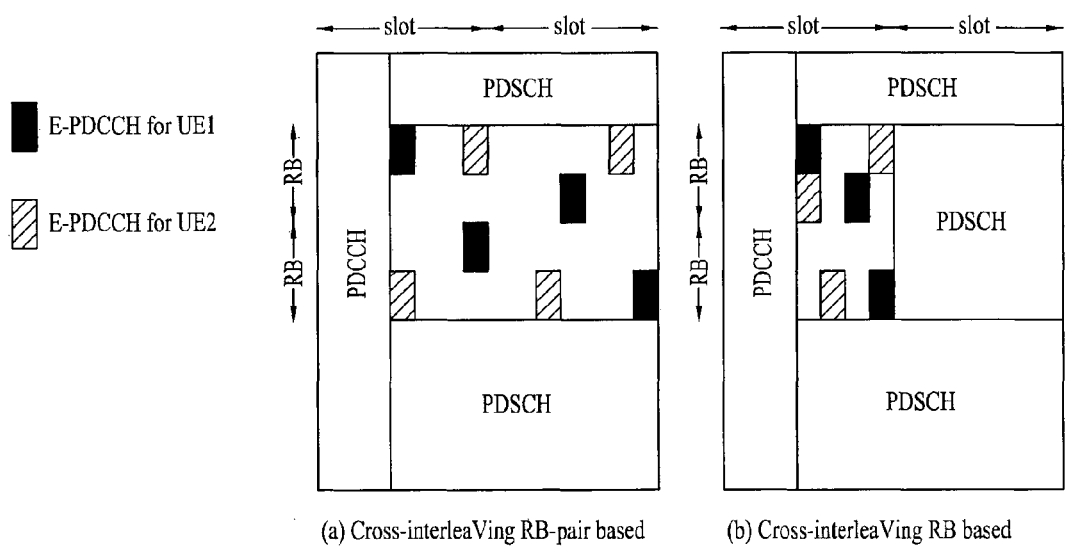
FIG. 8 illustrates cross-interleaving of an E-PDCCH.

FIG. 8 illustrates exemplary cross-interleaving of the E-PDCCH.

Referring to FIG. 8, a method for multiplexing the E-PDCCH is used in a manner similar to an R-PDCCH multiplexing method. Under the state that a common PRB set is configured, E-PDCCHs of a plurality of UEs are interleaved in time and frequency domains. It can be confirmed in FIG. 8 that an E-PDCCH of each UE is divided into several E-PDCCHs. Through this method, frequency/time diversity over a plurality of RBs can be obtained and thus advantages can be expected from the standpoint of diversity gain.

Figure 9:
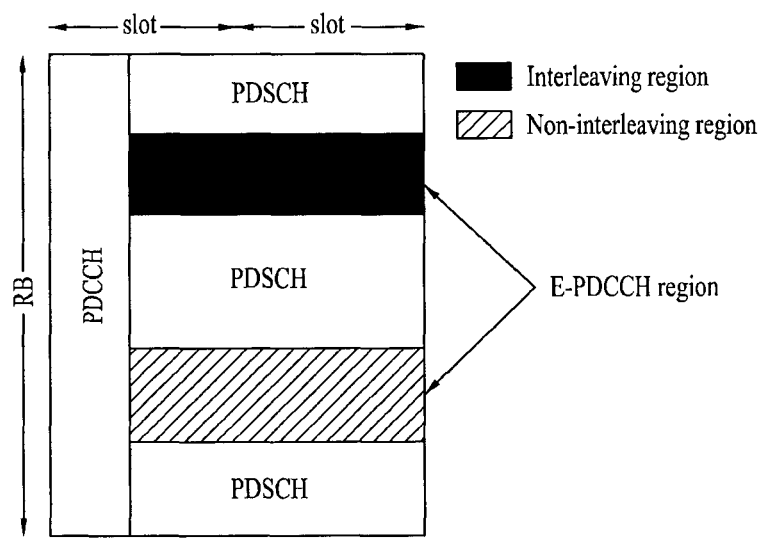
FIG. 9 illustrates exemplary allocation of an E-PDCCH to a resource configuration region for cross interleaving Or non-cross interleaving according to an exemplary embodiment of the present invention.

FIG. 9 illustrates exemplary allocation of an E-PDCCH to a resource configuration region for cross interleaving or non-cross interleaving according to an exemplary embodiment of the present invention.

Referring to FIG. 9, a resource region for an E-PDCCH format that is cross-interleaved, (hereinafter, referred to as an interleaving region), and a resource region for an E-PDCCH format that is not cross-interleaved, (hereinafter, referred to as a non-interleaving region), are configured. As another embodiment, a resource region for a common search space and a resource region for a UE-specific search space are configured. As a further embodiment, a resource region for a first RNTI set among multiple RNTIs and a resource region for a second RNTI are configured. Since the resource region for the common search space is commonly applied to UEs, it may be positioned in the cross interleaving region. However, since UE-specific interleaving is not performed in the non-interleaving region, a plurality of cell IDs may be used in the non-interleaving region. If the resource region of the E-PDCCH is comprised of the interleaving region and non-interleaving region, a DMRS configuration method per region is different according to characteristics of each region. Since multiple E-PDCCHs may be mixed in the interleaving region, the same antenna port and/or DMRS sequence should be configured. However, in the non-interleaving region, multiple antenna ports and/or DMRS sequences may be configured.

Referring to FIG. 9, a resource region for E-PDCCH formats with cross-interleaving, (hereinafter, referred to as an interleaving region), and a resource region for E-PDCCH formats without crossing-interleaving, (hereinafter, referred to as a non-interleaving region), are configured as an E-PDCCH resource region. As another embodiment, a resource region for a common search space and a resource region for a UE-specific search space may be configured. As a further embodiment, a resource region for a first RNTI set among multiple RNTIs and a resource region for a second RNTI may be configured. FIG. 9 shows an exemplary E-PDCCH region configured by the interleaving region and the non-interleaving region. As an interleaving unit of the E-PDCCH, both the method shown in FIG. 8 for partially dispersing Control Channel Elements (CCEs) in an RB and an interleaving method on a slot basis may be applied. To decode the E-PDCCH, a DMRS port suitable for each region should be basically allocated and a corresponding DMRS sequence should also be configured. A Physical Cell ID (PCI) is basically used for configuring the DMRS sequence. To multiplex the E-PDCCH, it may be additionally considered that a CSI-RS is configured instead of the PCI or a flexible PCI is configured using dedicated signaling.

Figure 10:
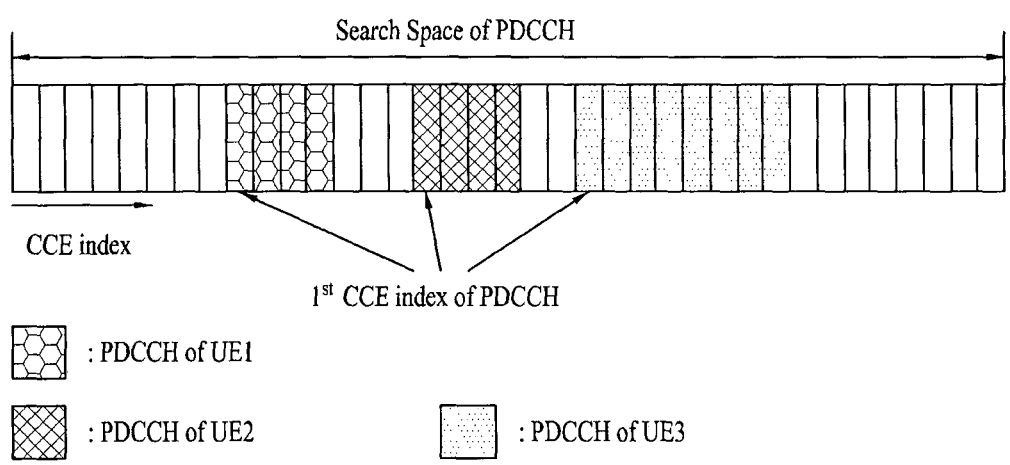
FIG. 10 conceptually illustrates a first CCE index $n_{CCE}$.

FIG. 10 conceptually illustrates a first CCE index $n_{CCE}$. A PUCCH resource allocation method of a legacy 3GPP Rel-10 is shown.

In a current 3GPP LTE system, an ACK/NACK of a PDSCH is transmitted through a PUCCH which is a UL control channel. In this case, information transmitted through the PUCCH varies according to format. This is summarized as follows.

In the LTE system, a PUCCH resource for ACK/NACK is not pre-allocated to each UE and a plurality of UEs in a cell uses a plurality of PUCCH resources separately at each time point. Specifically, the PUCCH resource used by the UE to transmit ACK/NACK is implicitly determined based on a PDCCH carrying scheduling information for a PDSCH carrying DL data. An entire, region in which the PDCCH is transmitted in a DL subframe is comprised of a plurality of CCEs and the PDCCH transmitted to the UE is comprised of one or more CCEs. A CCE includes plural (e.g. 9) Resource Element Groups (REGs). One REG includes four neighboring REs except for an RS. The UE transmits ACK/NACK through an implicit PUCCH resource induced or calculated by a function of a specific CCE index (e.g. the first or lowest CCE index) among CCE indexes constituting the PDCCH received thereby.

Referring to FIG. 10, each PUCCH resource index corresponds to a PUCCH resource for an ACK/NACK. For example, assuming that scheduling information for a PDSCH is transmitted to the UE through a PDCCH including CCE indexes 4 to 6, the UE transmits ACK/NACK to a BS through a PUCCH induced or calculated from the lowest CCE index 4, for example, through a PUCCH index 4.

PUCCH formats 1a/1b may transmit information about ACK/NACK, PUCCH formats 2/2a/2b may transmit information about CQI and about the CQI and ACK/NACK, and a PUCCH format 3 may transmit information about multiple ACKs/NACKs.

In this case, PUCCH resource indexes $n_{PUCCH}^{(1)}$ and $n_{PUCCH}^{(2)}$ are defined and PUCCH resource allocation is performed using the PUCCH resource indexes according to format.

$n_{PUCCH}^{(2)}$ is a resource index for PUCCH formats 1/1a/1b and $n_{PUCCH}^{(2)}$ is a resource index for PUCCH formats 2/2a/2b. A resource allocation method using the two parameters $n_{PUCCH}^{(1)}$ and $n_{PUCCH}^{(2)}$ is as follows.

First, $n_{PUCCH}^{(1)}$ and $n_{PUCCH}^{(2)}$ are determined. $n_{PUCCH}^{(1)}$ is determined as follow.

A Semi-Persistent Scheduled (SPS)-UE and a scheduling request may be designated through RRC signaling and a resource index for, for example, PUCCH formats 1/1a/1b may be determined by Equation 6.

$$n_{PUCCH}^{(1)} = n_{CCE} + N_{PUCCH}^{(1)} \quad \text{[Equation 6]}$$

where $n_{PUCCH}^{(1)}$ denotes a PUCCH resource index for ACK/NACK transmission, $N_{PUCCH}^{(1)}$ denotes the number of CCEs in a PUCCH, which is a signaling value received from a higher layer as indicated by Equation 7, and $n_{CCE}$ denotes the first CCE index of a PDCCH which is the lowest value among CCE indexes used for PDCCH transmission.

$$N_{PUCCH}^{(1)} = c \cdot N_{sc}^{RB} / \Delta_{shift}^{PUCCH},$$ [Equation 7]

$$c = \begin{cases} 3 & \text{normal cyclic prefix} \\ 2 & \text{extended cyclic prefix}, \ N_{sc}^{RB} = 12, \ \Delta_{shift}^{PUCCH} \in \{1, 2, 3\} \end{cases}$$

$n_{PUCCH}^{(2)}$ is UE-specifically, semi-statically determined by RRC signaling as indicated by Equation 6 and denotes a parameter cqi-PUCCH-ResourceIndex included in an CQI-ReportConfig RRC message.

Second, an orthogonal sequence index and a cyclic shift are determined using the determined $n_{PUCCH}^{(1)}$ and $n_{PUCCH}^{(2)}$. Third, referring to FIG. 11, a physical resource for the PUCCH resource index is allocated.

Figure 11:
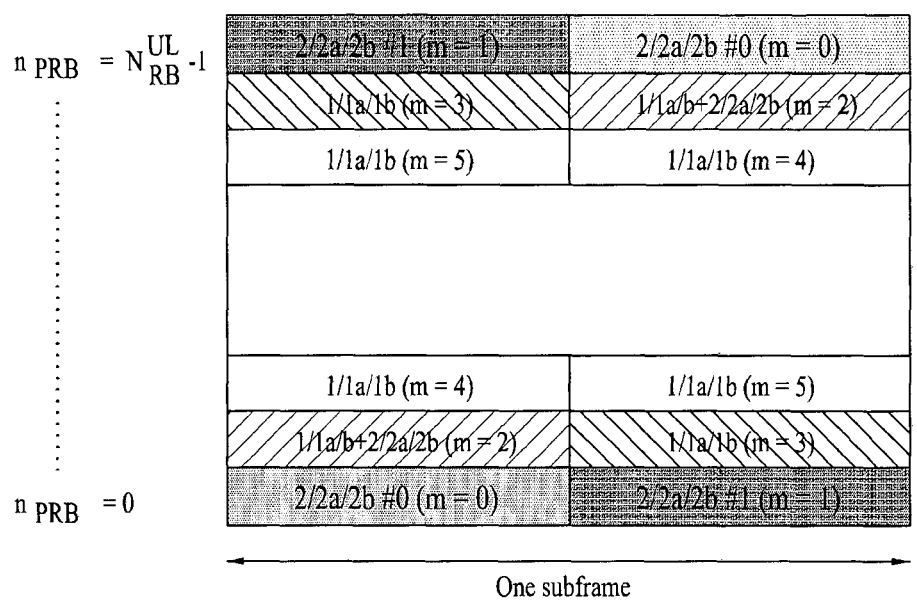
FIG. 11 illustrates physical mapping of a PUCCH format to a PUCCH resource block or region.

FIG. 11 illustrates physical mapping of a PUCCH format to a PUCCH resource block or region.

An RB index m allocated to a physical region according to $n_{PUCCH}^{(1)}$, and $n_{PUCCH}^{(2)}$ per UE is calculated. A PUCCH resource is allocated from the edge of the PUCCH resource region starting from PUCCH format 2. A region to which a mixed format of formats 1/1a/1b and 2/2a/2b is allocated is only one. Formats 1/1a/1b are allocated to an inner side of the PUCCH resource. The PUCCH formats are allocated by a slot hopping (RB unit) scheme in one subframe.

Figure 12:
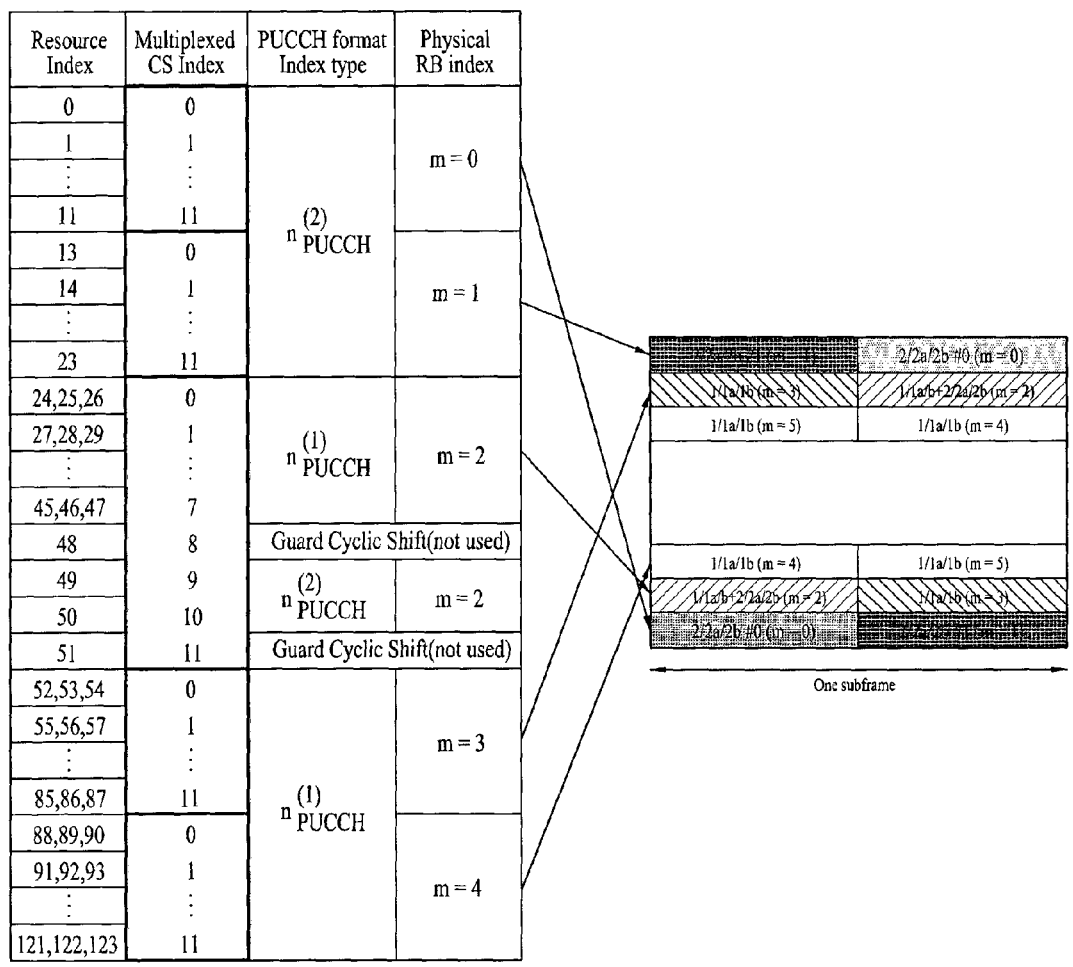
FIG. 12 illustrates the relationship between a PUCCH resource index and a physical RB index m.

FIG. 12 illustrates the relationship between a PUCCH resource index and a physical RB index m.

The allocation relationship between a PUCCH resource index and a mapped physical RB in a logical domain allocated per UE is as follows.

Referring to FIG. 12, a system parameter includes a cyclic shift value, a normal CP, etc. The cyclic shift value is $\Delta_{shift}^{PUCCH}=1$ and may have a value up to 12. A normal CP is $c=3$, $N_{PUCCH}^{(1)}$ is $N_{PUCCH}^{(1)}=c \cdot N_{sc}^{RB}/\Delta_{shift}^{PUCCH}=36$, and bandwidth for PUCCH formats 2/2a/2b is $N_{RB}^{(2)}=2 \cdot N_{sc}^{RB}=24$. In addition, the number of cyclic shifts for PUCCH formats 1/1a/1b in a mixed RB of formats 1/1a/1b and 2/2a/2b is $N_{cs}^{(1)}=7$.

In the present invention, a PUCCH resource allocation method for ACK/NACK transmission of a PDSCH scheduled from an E-PDCCH is provided. For ACK/NACK transmission of the PDSCH scheduled from the E-PDCCH, a 'CCE index' for PUCCH resource allocation is needed. Namely, PUCCH resource allocation is performed by the above Equation 6.

However, since the E-PDCCH is transmitted in a region different from a region in which a legacy PDCCH is transmitted, a CCE index corresponding to the E-PDCCH should be defined. The CCE index of the E-PDCCH for resource allocation for transmitting ACK/NACK to the PUCCH is defined as an enhanced CCE (eCCE) index. The eCCE index may be configured in the unit of an E-PDCCH set.

In the present invention, although the E-PDCCH region is separately described as an 'interleaving region' and a 'non-interleaving region', an application example thereof is not limited. Hereinafter, an interleaving region for the E-PDCCH is referred to as a 'first region' and a non-interleaving region for the E-PDCCH is referred to as a 'second region'. A description will first be given of the case in which a PUCCH resource is commonly used between the E-PDCCH and a legacy PDCCH.

Figure 13:
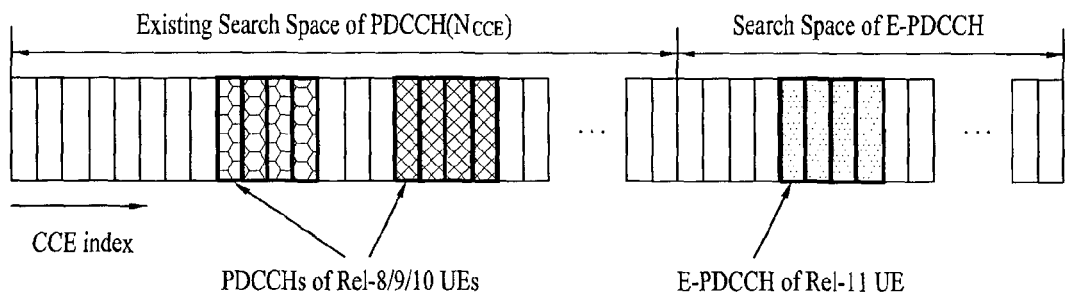
FIG. 13 illustrates search space concatenation based on $N_{CCE}$ according to the present invention.

FIG. 13 illustrates search space concatenation based on $N_{CCE}$ according to the present invention.

As a first proposal of the present invention, a final CCE index is induced by adding a total number of CCEs of a legacy PDCCH to a first CCE index of an E-PDCCH in the first region and a PUCCH resource for ACK/NACK transmission is allocated using the final CCE index. In this case, a UE may semi-statically specify the PUCCH resource for ACK/NACK transmission in the unit of each E-PDCCH set by a PUCCH resource start offset. The eCCE may be used to employ a dynamic or non-dynamic PUCCH resource offset by the E-PDCCH.

In the first proposal, the eCCE, which is a CCE index of an E-PDCCH in the first region, is determined separately from a legacy PDCCH region. Namely, operation for detecting the first CCE index of the E-PDCCH is identical to operation for detecting a CCE index in a legacy release-10 LTE system. However, if the CCE index of the E-PDCCH is overlapped with the CCE index of the legacy PDCCH, PUCCH resources may collide. Therefore, as shown in FIG. 13, the CCE index $n_{CCE}^{R1}$ of the E-PDCCH is assigned after the CCE indexes of the legacy PDCCHs as given by Equation 8 in order to protect the ACK/NACK transmission of the legacy PDCCH.

$$n_{PUCCH}^{(1,p=p_0)}=n_{CCE}^{R1}+N_{CCE}+N_{PUCCH}^{(1)}$$ [Equation 8]

In order for the UE to obtain information about a total number of CCEs of the legacy PDCCH, $N_{CCE}$, the following UE operation may be additionally defined.

In the present invention, if the UE monitors the legacy PDCCH region, the UE itself calculates $N_{CCE}$ and, if not, $N_{CCE}$ is signaled to the UE. In this case, $N_{CCE}$ may be the number of CCEs of an actual legacy PDCCH or may be a value signaled after the BS arbitrarily determines a maximum number of CCEs for long-term signaling.

If a PUCCH resource between the E-PDCCH and the legacy PDCCH is separately used, a PUCCH resource for ACK/NACK transmission may be allocated using the first CCE index of the E-PDCCH without considering a total number of CCEs of the legacy PDCCH, $N_{CCE}$, as indicated by Equation 9.

$$n_{PUCCH}^{(1,p=p_0)}=n_{CCE}^{R1}+N_{PUCCH}^{(1)}$$ [Equation 9]

In a second proposal of the present invention, the lowest RB index of the E-PDCCH or a PDSCH scheduled through the E-PDCCH is defined as a first CCE index in the second region and a PUCCH resource for ACK/NACK transmission is allocated using the first CCE index.

In the second proposal, an ACK/NACK resource cannot be mapped because it is impossible to allocate the CCE index to the E-PDCCH. Accordingly, a reference value which can replace the first CCE index of the E-PDCCH should be defined. To this end, the UE may use the lowest RB index (considering an aggregation level) detecting the E-PDCCH or the lowest RB index scheduled through the E-PDCCH as the first CCE index. However, since such operation may generate collision in PUCCH resource allocation when the CCE index is overlapped with a CCE index of the legacy PUCCH, it is desirable to allocate the PUCCH resource after $N_{CCE}$ of the PDCCH as indicated by Equation 10 as in the first proposal.

$$n_{PUCCH}^{(1,p=p_0)}=n_{CCE}^{R2}+N_{CCE}+N_{PUCCH}^{(1)}$$ [Equation 10]

To obtain a total number of CCEs of the legacy PDCCH, $N_{CCE}$, the following UE operation may be additionally defined.

In the second proposal, if the UE monitors the legacy PDCCH region, the UE itself calculates $N_{CCE}$ and, if not, $N_{CCE}$ is signaled to the UE.

If ACK/NACK resources collide due to sharing of the PUCCH resource between the first region and the second region, the PUCCH resource for ACK/NACK transmission can be allocated using a total number of CCEs of the first region and the CCE index (or the lowest RB index) of the E-PDCCH of the second region.

In a situation in which the E-PDCCH of the first region and the E-PDCCH of the second region are simultaneously mapped to an ACK/NACK region of the legacy PDCCH, ACK/NACK mapping may collide due to repetitive CCE indexes between E-PDCCHs. In this case, collision of the ACK/NACK resource can be prevented through allocation of the CCE index of the second region after a total number of CCEs of the first region, $N_{CCE}^{R1}$, as indicated by Equation 11. Accordingly, the CCE index of the E-PDCCH is determined by further considering the total number of CCEs of the first region.

$$n_{PUCCH}^{(1,p=p_0)} = n_{CCE}^{R2} + N_{CCE}^{R1} + N_{CCE} + N_{PUCCH}^{(1)} \quad \text{[Equation 11]}$$

However, when the PUCCH resource is separately used between all E-PDCCH regions and the legacy PDCCH, the first CCE index of the E-PDCCH is used to allocate the PUCCH resource for ACK/NACK transmission. Accordingly, in this case, the CCE index of the E-PDCCH may be determined as indicated by Equation 12 without considering a total number of CCEs of the first region, $N_{CCE}^{R1}$, and a total number of CCEs of the legacy PDCCH, $N_{CCE}$.

$$n_{PUCCH}^{(1,p=p_0)} = n_{CCE} + N_{PUCCH}^{(1)} \quad \text{[Equation 12]}$$

When a plurality of UEs simultaneously uses the lowest RB index as a CCE index, collision can be prevented using an offset value.

If two or more UEs simultaneously configure a CCE index using the same lowest RB index (MU-MIMO transmission), the same CCE index may be differently configured using an offset value. The offset value may use a DMRS port, UE. RNTI, etc. used when the UE detects the E-PDCCH. Therefore, in localized E-PDCCH allocation, an antenna port of the E-PDCCH (i.e. DMRS port) or an antenna port of the PDSCH may be used instead of the lowest eCCE index.

As a third proposal of the present invention, a PUCCH region for the E-PDCCH may be configured in an ACK/NACK region of the legacy PUCCH and, in this case, additional signaling to the UE may be performed. Namely, the eCCE indexed per E-PDCCH set may be signaled and the PUCCH resource including ACK/NACK of the PDSCH scheduled to the E-PDCCH may be semi-statically configured through signaling. The PUCCH resource may be dynamically/non-dynamically configured. Signaling is not limited to RRC signaling.

FIG. 14 illustrates separate configuration of a PUCCH ACK/NACK resource for an E-PDCCH according to the present invention.

An ACK/NACK resource of the E-PDCCH may be configured by a separate PUCCH resource as shown in FIG. 14 and only ACK/NACK of the E-PDCCH is allocated and transmitted in a corresponding region. Conversely, the PUCCH resource of the E-PDCCH may be configured without distinguishing it from the legacy PDCCH. The UE should recognize PUCCH configuration information to map ACK/NACK of a scheduled PDSCH to the PUCCH. The PUCCH ACK/NACK configuration information may be directly transmitted to the UE using RRC signaling or dynamic signaling or the UE may implicitly recognize the PUCCH configuration information using a cell ID (PCI or virtual PCI), CSI-RS configuration (port/sequence configuration) information, and DMRS configuration (port/sequence configuration) information.

An additional PUCCH resource for the E-PDCCH is configured and the first region and the second region are separately configured even in a corresponding region.

In the third proposal of the present invention, if the first region and the second region are separately configured, Equation 9 or Equation 12 in the case in which the region of the first proposal and the region of the second proposal are separated may be identically applied. Namely, since collision does not occur in PUCCH ACK/NACK resource mapping per region, legacy operation for allocating legacy PUCCH ACK/NACK may be identically reused.

In proposal 3-2 of the present invention, the first region and the second region are simultaneously configured in the additional PUCCH resource for the E-PDCCH.

In the proposal 3-2 of the present invention, the above-mentioned first proposal and second proposal may be applied or may be oppositely applied. Namely, since collision may occur in PUCCH ACK/NACK mapping between the first region and the second region, collision of the ACK/NACK resource may be prevented in consideration of a total number of ACK/NACK resources or a total number of CCEs of each region.

Figure 15:
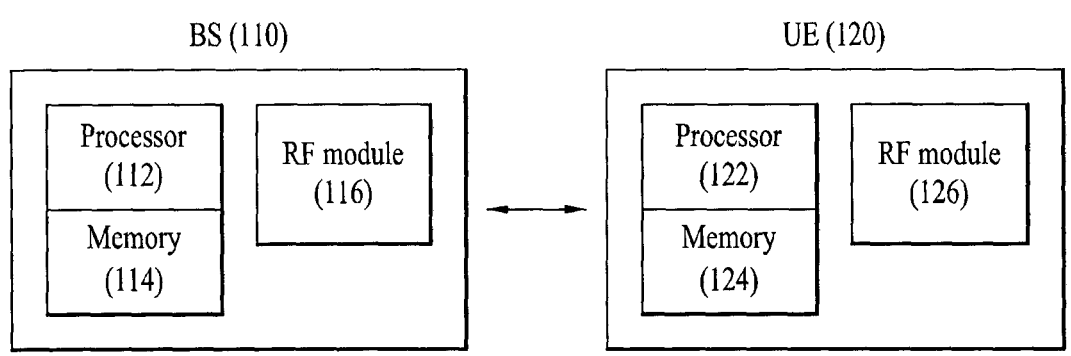
FIG. 15 illustrates a BS and a UE which are applicable to an exemplary embodiment of the present invention.

FIG. 15 illustrates a BS and a UE which are applicable to an exemplary embodiment of the present invention.

The UE may operate as a transmitter in UL and as a receiver in DL. Conversely, the BS may operate as a receiver in UL and as a transmitter in DL.

Referring to FIG. 15, a radio communication system includes a BS 110 and a UE 120. The BS 110 includes a processor 112, a memory 114, and a Radio Frequency (RF) unit 116. The processor 112 may be configured to implement the procedures and/or methods proposed in the present invention. The memory 114 is connected to the processor 112 and stores information related to operation of the processor 112. The RF unit 116 is connected to the processor 112 and transmits and/or receives RF signals. The UE 120 includes a processor 122, a memory 124, and an RF unit 126. The processor 122 may be configured to implement the procedures and/or methods proposed in the present invention. The memory 124 is connected to the processor 122 and stores information related to operation of the processor 122. The RF unit 126 is connected to the processor 122 and transmits and/or receives RF signals. The BS 110 and/or the UE 120 may have a single antenna or multiple antennas.

The above-described embodiments are combinations of constituent elements and features of the present invention in a predetermined form. The constituent elements or features should be considered selectively unless otherwise mentioned. Each constituent element or feature may be practiced without being combined with other constituent elements or features. Further, the embodiments of the present invention may be constructed by combining partial constituent elements and/or partial features. Operation orders described in the embodiments of the present invention may be rearranged. Some constructions or features of any one embodiment may be included in another embodiment or may be replaced with corresponding constructions or features of another embodiment. It is apparent that the embodiments may be constructed by a combination of claims which do not have an explicitly cited relationship in the appended claims or may include new claims by amendment after application.

The embodiments of the present invention may be achieved by various means, for example, hardware, firmware, software, or a combination thereof. In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention may be used for a UE, a BS, or other equipment of a wireless communication system. Specifically, the present invention may be used for a multi-node system that provides a communication service to a UE through a plurality of nodes.

The invention claimed is:

1. A method for transmitting an uplink control channel to a base station at a user equipment in a wireless communication system, the method comprising:
    receiving a downlink control channel and a downlink shared channel from the base station,
    allocating a resource ($n_{PUCCH}^{(1)}$) to the uplink control channel for the downlink shared channel; and
    transmitting the uplink control channel using the allocated resources to the base station,
    wherein $n_{PUCCH}^{(1)}$ is determined according to $n_{PUCCH}^{(1)} = N_{CCE} + N_{PUCCH}^{(1)} + n'$,
    wherein $n_{CCE}$ is a lowest index of the plurality of control channel elements constructing the downlink control channel, $N_{PUCCH}^{(1)}$ is configured by a higher layer, and n' is an offset value, and
    wherein the offset value is derived by using an antenna port index of a user specific reference signal for the downlink control channel.

2. The method of claim 1, further comprising:
    demodulating the downlink control channel using the user specific reference signal.

3. The method of claim 1, further comprising:
    decoding the downlink shared channel, and
    generating ACK(Acknowledgement)/NACK(Negative-ACK) information for the downlink shared channel,
    wherein the uplink control channel carries the ACK/NACK information.

4. The method of claim 1, wherein the downlink control channel carries downlink control information (DCI) for the downlink shared channel.

5. A method for receiving an uplink control channel from a user equipment at a base station in a wireless communication system, the method comprising:
    transmitting a downlink control channel and a downlink shared channel to the user equipment, and
    receiving the uplink control channel for the downlink shared channel from the user equipment,
    wherein a resource ($n_{PUCCH}^{(1)}$) for the uplink control channel is determined according to $n_{PUCCH}^{(1)} = N_{CCE} + N_{PUCCH}^{(1)} + n'$,
    wherein $n_{CCE}$ is a lowest index of the plurality of control channel elements constructing the downlink control channel, $N_{PUCCH}^{(1)}$ is configured by a higher layer, and n' is an offset value, and
    wherein the offset value is derived by using an antenna port index of a user specific reference signal for the downlink control channel.

6. The method of claim 5, further comprising:
    modulating the downlink control channel using the user specific reference signal.

7. The method of claim 5, wherein the uplink control channel carries ACK(Acknowledgement)/NACK(Negative-ACK) information for the downlink shared channel.

8. The method of claim 5, wherein the downlink control channel carries downlink control information (DCI) for the downlink shared channel.

* * * * *